United States Patent Office 3,483,454
Patented Dec. 9, 1969

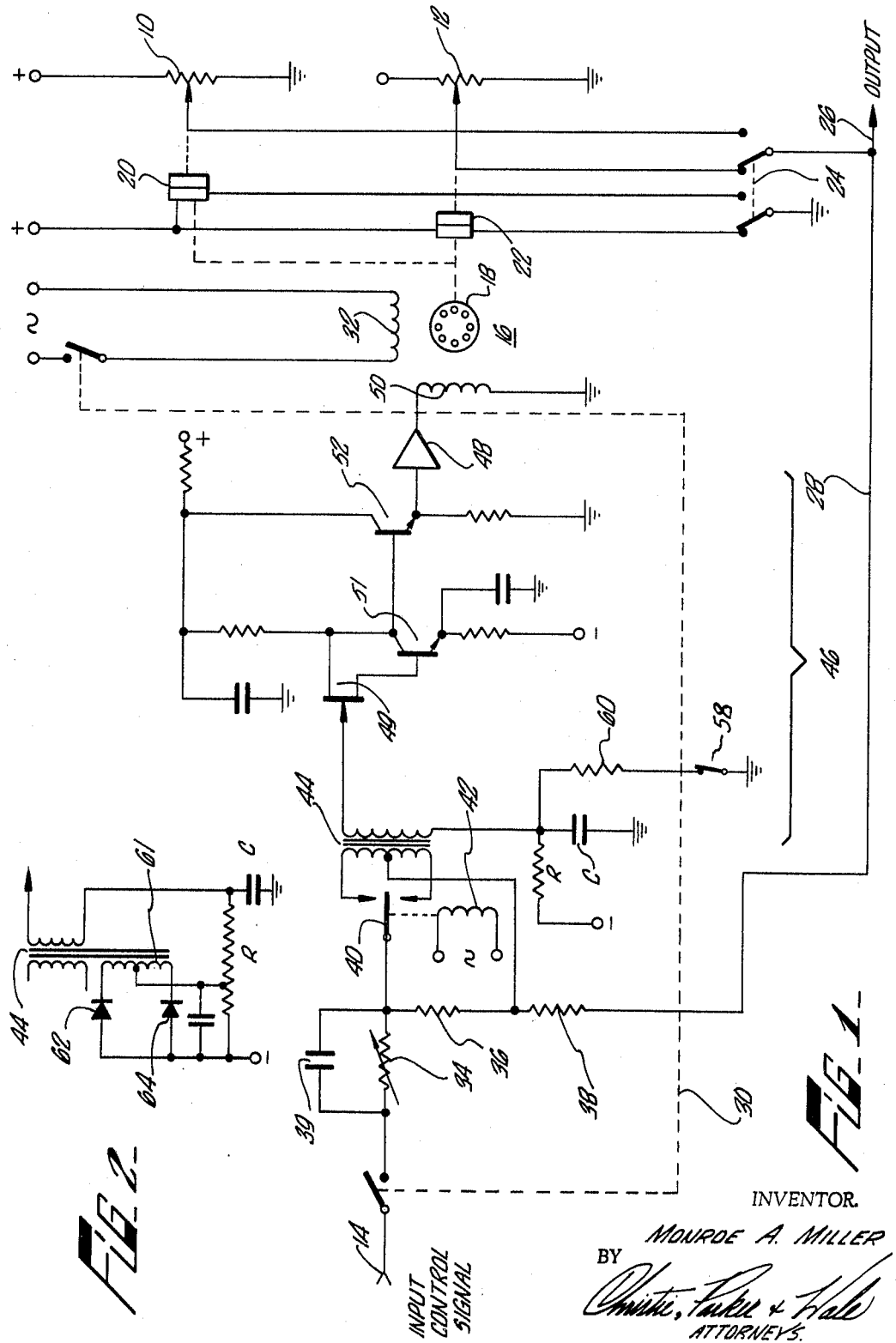

3,483,454
CLOSED LOOP SERVO FOR SETTING
POTENTIOMETERS
Monroe A. Miller, Coral Gables, Fla., assignor to Milgo Electronic Corporation, Miami, Fla., a corporation of Florida
Filed Dec. 13, 1965, Ser. No. 513,282
Int. Cl. H02p 1/54, 5/46, 7/74
U.S. Cl. 318—18                    6 Claims

ABSTRACT OF THE DISCLOSURE

A closed loop servo circuit for positioning a plurality of different loads such as potentiometers on a time sharing basis is described. The servo loop includes a variable gain amplifier having at least one stage in which the gain is controlled by a bias voltage, the gain increasing with a decrease in bias voltage level and vice versa. Means including a timing circuit are connected to the first stage of the amplifier for initially setting the bias voltage to a first level and for increasing the bias voltage level toward a second level as a function of time when the timing circuit is actuated. At the time a new load is switched into the servo loop the gain of the amplifier is at its initial peak or first level. The timing circuit is then actuated to provide a decrease in gain with time. Reducing the gain improves the stability as a null position is approached so that the servo loop is provided with a maximum stability for positioning a plurality of different loads in a minimum time.

This invention relates to potentiometer positioning servos and, more particularly, is concerned with an improved amplifier circuit for use in a closed loop positioning servo.

It is well known that analog computers use a plurality of potentiometers for setting constants and initial conditions in the operation of the computer. Because manual setting of these potentiometers is a time consuming problem, it has been desirable to provide automatic initial setting of the potentiometers using positioning servos. Since one computer may use a large number of such potentiometers, to use a separate servo for each potentiometer results in a costly installation. It has, therefore, been proposed to utilize a single positioning servo to set a number of potentiometers on a time sharing basis.

In copending application Ser. No. 506,517, filed Nov. 5, 1965, now issued as Patent No. 3,339,686 in the name of the inventor of the present invention, there is described a servo arrangement for setting each one of a plurality of potentiometers from input control signals. The potentiometers time share a common servo drive circuit by means of a special clutching arrangement that enables any one of the potentiometers to be positioned by a common servo drive motor. The particular potentiometer which is connected to the servo drive motor serves also as the sensing unit for the feedback loop of the servo.

One difficulty in time sharing of the servo is that each potentiometer represents a different load to the servo. Thus if the servo is designed to be critically damped for operation with one potentiometer, it may be underdamped when used with another potentiometer, resulting in excessive hunting, or it may be overdamped, resulting in an excessive time to reach a null position.

The present invention provides an improved servo circuit for positioning a plurality of different loads, such as potentiometers, on a time sharing basis. This is accomplished, in brief, by providing a pre-amplifier in the servo loop, in which the gain is controlled as a function of time. At the time a new load is switched into the servo loop, the gain of the pre-amplifier is at its initial peak level and then decreases with time. By reducing the gain, stability is improved as a null condition is approached. As a result, maximum stability with minimum correction time is achieved for a wide range of load conditions.

For a more complete understanding of the invention, reference should be made to the accompanying drawings, wherein:

FIGURE 1 is a schematic diagram of the servo circuit incorporating the features of the present invention; and
FIGURE 2 is a modification to the circuit of FIGURE 1.

Referring to the drawings in detail, the numerals 10 and 12 indicate, by way of example, two potentiometers which are to be set to preselected values. It will be understood that in a typical installation, the number of potentiometers would be considerably greater than two. The selected potentiometer is set in response to an input control signal applied to an input terminal 14. A drive motor 16, for example an AC split phase motor, is operated as part of the servo in response to the input control signal 14 to position one of the potentiometers 10 or 12. The rotor 18 of the motor 16 is coupled to a selected one of the potentiometers by means of electrically operated clutches 20 and 22. A switch 24, set to one of two positions, selectively energizes either the clutch 20 or the clutch 22 to permit one or the other of the potentiometers 10 and 12 to be driven by the motor 16.

The selected potentiometer acts as its own position sensing element in the closed loop servo. To this end, the switch 24 selectively connects the wiper contacts of the potentiometers 10 and 12 to an output terminal 26 and also to a feedback line 28.

After a particular potentiometer has been selected, when it is desired to set the potentiometer to a particular value, the appropriate voltage is applied to the input terminal 14 and a switch 30 is actuated to complete a circuit to the input terminal 14 and also to energize one split field winding 32 of the motor 16 from an AC source. The input signal at the terminal 14 is connected by the switch 30 to one end of a voltage divider which includes a variable resistor 34, a resistor 36, and a resistor 38 connected in series to the feedback line 28. A damping capacitor 39 is connected in shunt across the variable resistor 34. The voltage across the resistor 36, which is proportional to the difference between the level of the input signal and the level of the output signal, is applied to a chopper which includes a switch element 40 driven from an AC source by a chopper coil 42. One end of the resistor 36 is connected to the pole of the switch 40 and the other end of the resistor 36 is connected to the center tap of the primary winding of a coupling transformer 44, the two ends of the primary being connected to the contacts of the chopper switch 40.

The output from the secondary of the transformer 44 is applied to a pre-amplifier indicated generally at 46, the output of which is coupled through a power amplifier 48 to the split field winding 50 of the servo motor 16.

The pre-amplifier 46 has three stages including a field effect transistor 49. The input signal is coupled to the first stage by connecting one end of the secondary of the input transformer 44 to the gate e'ectrode of the transistor 49. The source and drain electrodes of the field effect transistor 49 are connected to the base and collector of the second stage transistor 51. The collector of the second stage transistor in turn is coupled to the base of an emitter follower stage transistor 52.

The gain control feature of the pre-amplifier is provided by connecting the secondary of the input transformer 44 to a negative potential through a charging resistor R and connecting the same end of the secondary of the transformer 44 to ground through a large timing capacitor C. A pair of normally closed relay contacts 58 bypass the capacitor C to ground through a discharging resistor 60. With the relay contact 58 closed the resistors R and 60 function as a voltage devider and establish a predetermined voltage level across the capacitor C which is intermediate ground potential and the value of the netgative potential connected to the resistor R. Thus the capacitor is initially charged to tsaid predetermined voltage level, thereby providing an initial maximum level of bias for the pre-amplifier 46. A predetermined time after switch 30 is actuated to initiate a servo operation of a selected potentiometer in response to an input control signal, contact 58 is opened and the capacitor C begins to charge through the resistor R from the negative potential source. As the capacitor C charges, the bias level of the gate electrode of the transistor 49 goes more negative, reducing the gain of the pre-amplifier. Preferably the time constant of the resistor R and capacitor C is adjusted to provide a run down time from maximum gain to cut-off of from 400 to 1200 milliseconds, which is sufficient to permit the potentiometer to be adjusted to the null condition of the servo loop. As the bias level increases, the drop in gain of the pre-amplifier reduces the sensitivity of the loop but only after substantial initial adjustment of the potentiometer is made. Thus the servo loop provides high initial gain for maximum correction, with the gain being reduced as a null condition is approached. After gain has decreased to substantially zero, switch 30 is opened.

FIGURE 2 shows an alternative arrangement in which the resistor R charges the capacitor C from a variable voltage that is responsive to the magnitude of the error signal. A full wave rectifier including a secondary winding 61 on the transformer 44 and a pair of diodes 62 and 64 applies a voltage across a portion of the resistor R. This voltage, which is proportional to the amplitude of the error signal, decreases the rate at which the timing network changes the gain if the error voltage is initially large.

What is claimed is:

1. In a closed loop servo circuit for setting a potentiometer to a selected setting wherein the potentiometer is driven by a motor in response to the output of an amplifier and the input to the amplifier is proportional to the difference between the output of the potentiometer and a control signal, the improvement comprising a timing circuit, means for activating the servo circuit and the timing circuit at a predetermined point in time, and means responsive to the timing circuit for decreasing the gain of the amplifier from an initial maximum level at a rate controlled by the timing circuit independently of the input to the amplifier.

2. Apparatus as defined in claim 1 wherein the timing circuit includes a resistor-capacitor circuit, means for initially charging the capacitor to a first voltage level, and means for charging the capacitor through the resistor to a second voltage level in response to said activating means, said means for decreasing the gain of the amplifier including means for coupling the voltage across the capacitor to the amplifier to control the gain of the amplifier.

3. Apparatus as defined in claim 2 wherein said activating means includes a switch connected across the capacitor for discharging the capacitor.

4. In a closed loop servo circuit for adjusting an output signal to the level of an input signal the combination which comprises:
a variable gain amplifier having at least one stage in which the gain is controlled by a bias voltage level, the gain increasing with a decrease in bias voltage level and vice versa,
means including a timing circuit coupled to said one stage for setting the bias voltage at a first level when the timing circuit is inactivated and for increasing the bias voltage at a predetermined rate toward a second level when the timing circuit is activated,
means for actuating the servo circuit and the timing circuit to a predetermined point in time.

5. Apparatus as defined in claim 4 wherein said one stage comprises a field effect transistor having a gate electrode and said timing network includes a capacitor connected to the electrode and to a reference potential, means including a resistor for changing the capacitor relative to the reference potential and switching means shunning the capacitor for discharging the capacitor.

6. Apparatus as defined in claim 4 including:
a plurality of potentiometers,
a motor, and
a separate clutch for individually coupling the motor to each potentiometer,
means for comparing the input signal to the output signal,
means for selectively energizing the clutch coupled to a selected potentiometer, and
means for feeding back a voltage to the comparing means which is representative of the position of the selected potentiometer.

References Cited

UNITED STATES PATENTS

| | | | |
|---|---|---|---|
| 2,656,499 | 19/1953 | Goodwin | 318—448 |
| 2,744,227 | 5/1956 | Spindler | 318—448 |
| 2,760,131 | 8/1956 | Braunabel | 318—448 |
| 2,965,823 | 12/1960 | Wolman | 318—448 |
| 3,028,534 | 4/1962 | Chilton | 318—448 |

B. DOBECK, Primary Examiner

U.S. Cl. X.R.

318—28